United States Patent [19]

Lake, Jr. et al.

[11] Patent Number: 4,800,402
[45] Date of Patent: Jan. 24, 1989

[54] PLOTTER PAPER SIZING SYSTEM

[75] Inventors: Ralph J. Lake, Jr., Yorba Linda; Franklyn L. Wiley, Long Beach; A. Daniel Coby, Brea; John Pluth, Jr., Hacienda Heights, all of Calif.

[73] Assignee: CALCOMP Inc., Anaheim, Calif.

[21] Appl. No.: 142,059

[22] Filed: Jan. 7, 1988

[51] Int. Cl.⁴ .................... G01D 15/24; G01D 9/00; G06F 15/626

[52] U.S. Cl. .................. 346/139 R; 346/1.1; 364/520; 400/708

[58] Field of Search ............. 346/139 R, 134, 1.1; 364/520; 400/708

[56] References Cited

U.S. PATENT DOCUMENTS 4,567,565  1/1986  Haselby ........................ 364/520
4,737,645  4/1988  Lahr .............................. 400/708

Primary Examiner—Joseph W. Hartary
Assistant Examiner—Mark Reinhart
Attorney, Agent, or Firm—Donald A. Streck; Wm. F. Porter, Jr.

[57] ABSTRACT

A method and apparatus for providing automatic paper edge finding and sizing in a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with, for raising it from contact with the paper, and for providing a relative vertical position value signal. Vertical sensing apparatus is connected to the penholding apparatus for sensing the top surface of the platen. First logic is operably connected to the vertical sensing apparatus and to receive the vertical position value signal from the controlled raising and lowering mechanism for calculating and saving a plurality of values indicating the distance to the platen top surface at a plurality of spaced points across the platen. There is edge sensing apparatus carried by the penholding apparatus and cooperating with the vertical sensing apparatus for sensing the edges of paper, third logic for automatically moving the paper from end to end over the platen and for saving the positional values of the ends of the paper as found by the edge sensing apparatus, and fourth logic for automatically moving the penholding apparatus from side to side over the paper and for saving the positional values of the side edges of the paper as found by the edge sensing apparatus.

8 Claims, 2 Drawing Sheets

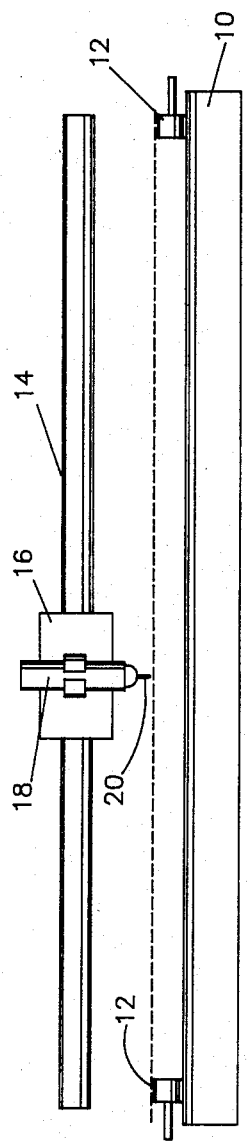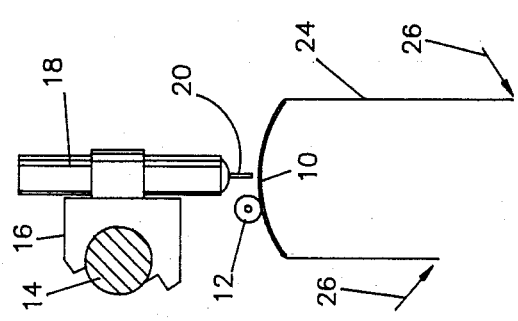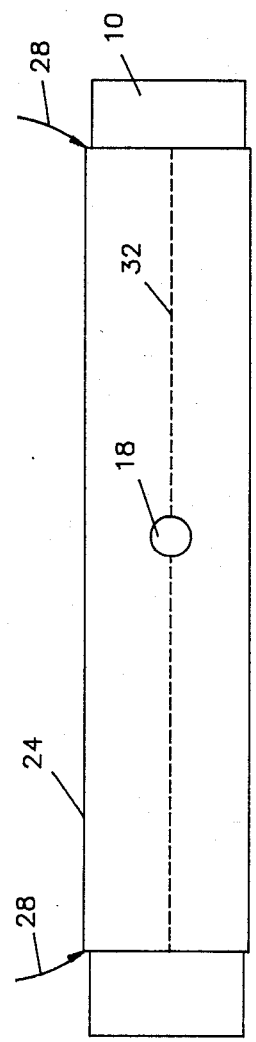

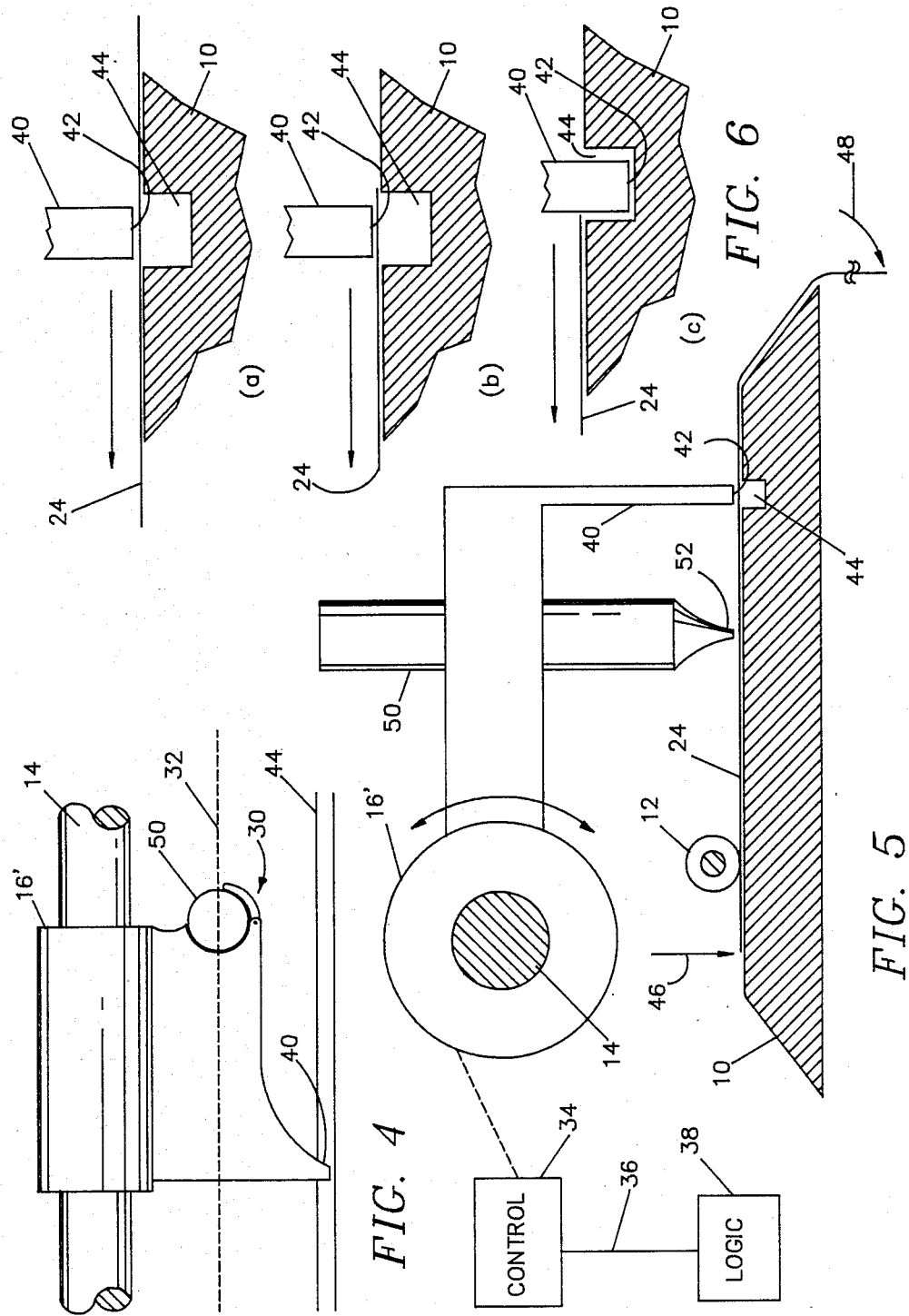

PLOTTER PAPER SIZING SYSTEM

BACKGROUND OF THE INVENTION

The present invention relates to graphics plotters and, more particularly, in a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with and for raising it from contact with the paper and for providing a relative vertical position value signal, to the improvement for allowing automatic paper sizing comprising, vertical sensing means carried by the penholding apparatus for sensing the top surface of the platen; history means operably connected to the vertical sensing means and to receive the vertical position value signal from the controlled raising and lowering mechanism for calculating and saving values indicating the distance to the platen top surface at a plurality of points across the platen; edge sensing means carried by the penholding apparatus and cooperating with the vertical sensing means and the history means for sensing the edges of paper; means for automatically moving the paper from end to end over the platen and for saving the positional values of the ends of the paper as found by the edge sensing means; and, means for automatically moving the penholding apparatus from side to side over the paper and for saving the positional values of the side edges of the paper as found by the edge sensing means.

The original graphics plotters as employed with computers to create two-dimensional graphics and drawings comprised a flat table upon which the drawing paper was fastened and over which a printhead assembly was moved by a beam also moving on spaced tracks parallel to one another. Such plotters were large and cumbersome, particularly with larger so-called "D" and "E" sized drawings as typically used in commercial applications. More recently, a single, non-moving-beam system such as that represented by the critical elements thereof in FIG. 1 has been employed as the standard approach to plotting. In such a plotter, there is a platen 10 over which the paper (not shown) is draped to be moved longitudinally for one axis by a pair of driven pinchrollers 12 positioned at the respective edges of the paper. The single beam 14 (typically in the form of a rod or bar) is disposed above and parallel to the top surface of the platen 10. A driven penholder 16 releasably gripping a pen 18 is moved transversely across the paper from side to side to create the other axis. An appropriate mechanism (not shown) is connected to raise and lower the pen 18 as by rotating the penholder 16 about the beam 14.

An important aspect of such plotters is the determination of paper size and position; that is, the plotter must "know" where the ends and side edges of the paper presently being used are located. Typically, the pinchrollers 12 are movable from side to side to adjust for different paper widths. Thus, the paper can be positioned anywhere along the platen 10. As depicted in FIGS. 2 and 3, the 0,0 coordinate point of the drawing must be established and the paper size available for the drawing determined prior to the plotting procedure being begun. Thus, as shown in FIG. 2, the paper 24 must be moved from end to end over the platen 10 by the pinch-rollers 12 so that the internal logic of the plotter (not shown) can establish internal values necessary to position the writing tip 20 relative to the two ends of the paper 24 indicated by the arrows 26. In similar manner, as depicted in FIG. 3, internal values must be established with respect to the side edges of the paper 24 indicated by the arrows 28. Typically in the prior art, these functions are manually accomplished by a human operator employing a joystick, buttons, and the like. The paper 24 and penholder 16 are moved by the operator using the mechanical input devices until the writing tip 20 is at an end or side edge. A button, or the like, is depressed to indicate to the internal logic the present location of the writing tip 20, with reference to calibration. Presently, there is no economical and reliable way in which such a plotter can automatically self-determine the locations of the ends and side edges.

Wherefore, it is an object of the present invention to provide an economical and reliable method and apparatus whereby a plotter can automatically determine the postiions of the edges of paper therein and the size of that paper.

Other objects and benefits of the present invention will become apparent from the detailed description contained hereinafter taken in conjunction with the accompanying drawing figures.

SUMMARY

The foregoing objects have been achieved in a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with and for raising it from contact with the paper and for providing a relative vertical position value signal, by the improvement of the present invention comprising, vertical sensing means carried by the penholding apparatus for sensing the top surface of the platen; means operably connected to the vertical sensing means and to receive the vertical position value signal from the controlled raising and lowering mechanism for calculating and saving a plurality of values indicating the distance to the platen top surface at a plurality of spaced points across the platen; edge sensing means carried by the penholding apparatus and cooperating with the vertical sensing means for sensing the edges of paper; means for automatically moving the paper from end to end over the platen and for saving the positional values of the ends of the paper as found by the edge sensing means; and, means for automatically moving the penholding apparatus from side to side over the paper and for saving the positional values of the side edges of the paper as found by the edge sensing means.

In the preferred embodiment, the edge sensing means comprises, a vertically oriented pawl carried by the penholding apparatus to be raised and lowered in combination therewith, the pawl having a bottom end positioned to contact the platen; a transverse slot in the platen positioned under the bottom end of the pawl such that prior to reaching an edge of the paper the bottom end contacts the paper and the positional sensing means generates a first signal and upon reaching an edge the bottom end drops off the paper and into the slot causing the positional sensing means to generate a second signal positionally lower than the first signal; and, means for sensing a step change in the vertical position value signal indicating the bottom end has dropped off the paper and into the slot at an edge.

DESCRIPTION OF THE DRAWINGS

FIG. 1 is a simplified drawing showing the relationship between the platen, driving pinch rollers, and moving pen in a contemporary plotter.

FIG. 2 is a simplified end view of the apparatus of FIG. 1 demonstrating the process of determining the positions of the end edges of paper disposed therein.

FIG. 3 is a top view of FIG. 2 showing the process of determining the paper side edges.

FIG. 4 is a top view of apparatus according to the present invention as employed to accomplish the stated objectives thereof.

FIG. 5 is an end view of the apparatus of FIG. 4.

FIGS. 6a, 6b and 6c are a simplified drawing showing the manner in which the present invention is able to determine the locations of the edges of paper automatically.

DESCRIPTION OF THE PREFERRED EMBODIMENT

The components of the present invention are shown in top and end views in FIGS. 4 and 5, respectively. As with the prior art discussed above, the present invention employs a cylindrical beam 14 upon which a driven penholder 16' is mounted for sliding and rotary movement. The penholder 16' has a releasable gripping mechanism 30 for releasably gripping a pin 18 therein. As the penholder 16' moves along the beam 14 from end to end, the writing tip 20 of the pen 18 moves along the dotted line 32. To raise and lower the pen 18 in the prior art, a so-called "bang bang" approach was used. The prior art penholder 16 is spring-biased in one direction and driven in the opposite direction by a solenoid. Thus, the penholder 16 (and pen 18) bang from one extreme to the other in a completely uncontrolled manner. By contrast, as depicted in simplified form in FIG. 10, the penholder 16' employed in the present invention is raised and lowered in a controlled manner by the control apparatus generally indicated by block 34. The control apparatus 34 is described in detail in co-pending application Ser. No. 086,950 filed Aug. 19, 1987 and entitled PLOTTER PEN UP/DOWN CONTROL SYSTEM by James Lawrence, which is also assigned to the common assignee of this application. A related application also employing the above-referenced control apparatus 34 for platen mapping purposes is co-pending application Ser. No. 07/141,652, filed Jan. 7, 1988, and entitled PLOTTER PLATEN MAPPING SYSTEM, which is also assigned to the common assigne of this application. For purposes of this application and the present invention, it is sufficient to say that the control apparatus 34 can accurately raise and lower the penholder 16' and, simultaneously, provide a positional signal on line 36 to the logic 38 employed by the present invention. Further to the accomplishment of the objects of the present invention, a vertical pawl 40 is attached to the penholder 16'.

Basically, portions of the above-referenced platen mapping functions as incorporated into the present invention provide measurements of the distance between the bottom contacting tip 42 of the pawl 40 and the surface of the platen 10. The distance values are stored in the logic 38 as needed and, during paper sizing, the values are employed to achieve the objects of the invention. By way of background, the platen mapping is accomplished by first inserting a pen-shaped test probe 50 into the driven penholder 16' in place of a pen 18, moving the driven penholder 16' to one side of the beam 14, and then moving it in step increments across the platen 10 to measure the deviation values at their respective points and store those deviation values within the logic 38. For this purpose, of course, logic 38 includes memory (not specifically shown). At each point, the penholder 16' is rotated downward by the control apparatus 34 and the positional signal from the control apparatus 34 fed to the logic 38 over line 36. The test probe 50 is rotated in combination with the penholder 16' until the contacting tip 52 contacts the platen 10. The various values are then compared to a reference value and the corresponding deviations stored within logic 38 for runtime use in adjusting the position of the writing tip 20 during "pen up" and "pen down" movements of the penholder 16'. At plotting time, the pre-stored deviation values resulting from the platen mapping operation are used in various ways. The pawl 40 of the present invention, of course, moves in the same manner and can be (and is) employed to provide distance information.

The major aspect of the present invention is providing the ability to map a sheet of paper placed in the plotter. With the present invention, this is an automatic process not requiring operator intervention as with the prior art approach to the problem. With the above-described apparatus, the only additional provision required to permit automatic paper mapping is the providing of a longitudinal groove 44 in the top of the platen 10 into which the contacting tip 42 of the pawl 40 can drop for purposes to be described in detail shortly. As best seen in FIG. 5, the groove 44 is parallel to the line 32 of pen movement such that the tip 42 of the pawl 40 can drop into the groove 44 at any point along its line of travel. The manner of operation of the present invention in mapping a sheet of paper is best understood with reference to FIGS. 5 and 6. The sheet of paper 24 is inserted with its leading edge positioned at a mark or stop as indicated by the arrow 46 and the pinch-rollers 12 lowered to grip the paper 24 at that point. This establishes the position of the leading edge of the paper in a manner well known and used in the art. Thereafter, control is given to logic 38 by the operator for automatic paper size mapping. The paper 24 is pulled beneath the pawl 40 by the pinch-rollers 12 towards the trailing edge of the paper indicated by the arrow 48. As depicted in FIGS. 6(a) and 6(b), the paper 24 is moved to the left as the figure is viewed with the pawl 40 in contact therewith, thus indicating a first vertical positional level. Just before reaching the trailing edge, the relationship is as shown in FIG. 6(b). As the trailing edge moves past the groove 44 as depicted in FIG. 6(c), the contacting tip 42 of the pawl 40 (now unstopped by the paper 24) is free to drop into the groove 44, thus giving a step change (relatively speaking as opposed to normal deviation found in platen mapping) in the vertical position of tip 42 relative to the previous positional levels. This step change in recognized by the logic 38 as comprising an edge of the paper and the distance travelled by the pinch-rollers 12 (which is known to the logic 38 by virtue of its having driven the pinch-rollers to arrive at the point) can be used to determine the length of the paper. A similar approach is employed in determining the edges of paper 24. The penholder 16' is moved along the paper to one side until the tip 42 of the pawl 40 falls off the side edge and drops into the groove 44 thus indicating the position of that edge. It is then moved to the opposite side where the same process is employed to determine the other edge of the paper 24. At that point, the relative positions of the four edges and the size of the paper 24 have been automatically determined without operator intervention. The paper size can then be calculated from the positions of the four edges by simple arithmetic well understood by those skilled in the art.

Wherefore, having thus described our invention, we claim:

1. In a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with and for raising it from contact with the paper and for providing a relative vertical position value signal, the improvement for allowing automatic paper sizing comprising:

(a) vertical sensing means carried by the penholding apparatus for sensing the top surface of the platen;

(b) history means operably connected to said vertical sensing means and to receive the vertical position value signal from the controlled raising and lowering mechanism for calculating and saving values indicating the distance to the platen top surface at a plurality of points across the platen;

(c) edge sensing means carried by the penholding apparatus and cooperating with said vertical sensing means and said history means for sensing the edges of paper;

(d) means for automatically moving the paper from end to end over the platen and for saving the positional values of the ends of the paper as found by said edge sensing mean; and, (e) means for automatically moving the penholding apparatus from side to side over the paper and for saving the positional values of the side edges of the paper as found by said edge sensing means.

2. The improvement of claim 1 wherein said edge sensing means comprises:

(a) a vertically oriented pawl carried by the penholding apparatus to be raised and lowered in combination therewith, said pawl having a bottom end positioned to contact the platen;

(b) a transverse slot in the platen positioned under said bottom end of said pawl such that prior to reaching an edge of the paper said bottom end contacts the paper and said positional sensing means generates a first signal and upon reaching an edge said bottom end drops off the paper and into said slot causing said positional sensing means to generate a second signal positionally lower than said first signal; and, (c) means for sensing a step change in the vertical position value signal indicating said bottom end has dropped off the paper and into said slot at an edge.

3. In a graphics plotter system having a platen over which paper is moved longitudinally to create one axis, penholding apparatus moved transversely across the platen and the paper to create the other axis, and a controlled raising and lowering mechanism connected to the penholding apparatus for lowering a pen being held therein into contact with and for raising it from contact with the paper and for providing a relative vertical position value signal, the improvement for allowing automatic paper edge finding and paper size determination comprising:

(a) vertical sensing means connected to the penholding apparatus for sensing the top surface of the platen;

(b) position history means operably connected to said vertical sensing means and to receive the vertical position value signal from the controlled raising and lowering mechanism for calculating and saving a present and a last value indicating the relative position of the platen top surface at a plurality of close spaced points across the platen;

(c) edge sensing means carried by the penholding apparatus cooperating with said vertical sensing means and operably connected to said position history means for sensing the edges of paper as a function of step changes in said present and saved last values;

(d) means for automatically moving the paper from end to end over the platen and for saving the positional values of the ends of the paper as found by said edge sensing means; and, (e) means for automatically moving the penholding apparatus from side to side over the paper and for saving the positional values of the side edges of the paper as found by said edge sensing means whereby the paper edge positions are determined and the paper size can be calculated.

4. The improvement of claim 3 wherein said vertical sensing means comprises:

(a) a vertically oriented pawl carried by the penholding apparatus to be raised and lowered in combination therewith, said pawl having a bottom end positioned to contact the platen; and said edge sensing means comprises, (b) a transverse slot in the platen positioned under said bottom end of said pawl such that prior to reaching an edge of the paper said bottom end contacts the paper and said positional sensing means generates a first signal and upon reaching an edge said bottom end drops off the paper and into said slot causing said positional sensing means to generate a second signal positionally lower than said first signal; and, (c) means for sensing a step change in the vertical position value signal indicating said bottom end has dropped off the paper and into said slot at an edge.

5. In a graphics plotter system having a platen over which paper is moved longitudinally to create one axis, penholding apparatus moved transversely across the platen and the paper to create the other axis, and a controlled raising and lowering mechanism connected to the penholding apparatus for raising and lowering a pen being held therein into contact with and for raising it from contact with the paper and for providing a relative vertical position value signal, the method of automatically finding the paper edges and determining paper size comprising the steps of:

(a) connecting vertical sensing means to the penholding apparatus to sense the top surface of the platen;

(b) calculating and saving a present and a last value indicating the relative position of the platen top surface at a plurality of close spaced points across the platen;

(c) sensing the edges of the paper as a function of step changes in the present and saved last values;

(d) automatically moving the paper from end to end over the platen and saving the positional values of the ends of the paper as found by said step of edge sensing;

(e) automatically moving the penholding apparatus from side to side over the paper and saving the positional values of the side edges of the paper as found by said step of edge sensing; and, (f) calculating the paper size from the saved positional values of the ends and side edges of the paper.

6. The method of claim 5 wherein said step of connecting vertical sensing means to the penholding apparatus to sense the top surface of the platen comprises the steps of:

(a) providing a vertically oriented pawl carried by the penholding apparatus to be raised and lowered in combination therewith wherein the pawl has a bottom end positioned to contact the platen;

(b) positioning a transverse slot in the platen under the bottom end of the pawl such that prior to reaching an edge of the paper the bottom end contacts the paper and generates a first signal and upon reaching an edge the bottom end drops off the paper and into said slot generating a second signal positionally lower than the first signal; and, (c) sensing a step change in the vertical positional value signal indicating the bottom end has dropped off the paper and into the slot at an edge.

7. In a graphics plotter system having a platen over which paper is moved longitudinally to create one axis; penholding apparatus moved transversely across the platen and the paper to create the other axis, a controlled raising and lowering mechanism connected to the penholding apparatus for lowering a pen being held therein into contact with and for raising it from contact with the paper and for providing a relative vertical position value signal, vertical sensing means carried by the penholding apparatus for sensing the top surface of the platen, and history means operably connected to the vertical sensing means and to receive the vertical position value signal from the controlled raising and lowering mechanism for calculating and saving values indicating the distance to the platen top surface at a plurality of points across the platen, the improvement for allowing automatic paper sizing comprising:

(a) edge sensing means carried by the penholding apparatus and cooperating with the vertical sensing means and the history means for sensing the edges of paper;

(b) means for automatically moving the paper from end to end over the platen and for saving the positional values of the ends of the paper as found by said edge sensing means; and, (c) means for automatically moving the penholding apparatus from side to side over the paper and for saving the positional values of the side edges of the paper as found by said edge sensing means.

8. The improvement of claim 7 wherein said edge sensing means comprises:

(a) a vertically oriented pawl carried by the penholding apparatus to be raised and lowered in combination therewith, said pawl having a bottom end positioned to contact the platen;

(b) a transverse slot in the platen positioned under said bottom end of said pawl such that prior to reaching an edge of the paper said bottom end contacts the paper and said positional sensing means generates a first signal and upon reaching an edge said bottom end drops off the paper and into said slot causing said positional sensing means to generate a second signal positionally lower than said first signal; and, (c) means for sensing a step change in the vertical position value signal indicating said bottom end has dropped off the paper and into said slot at an edge.

* * * * *